United States Patent
Ishikawa

(10) Patent No.: US 7,272,084 B2
(45) Date of Patent: Sep. 18, 2007

(54) OPTICAL DISC APPARATUS AND TRACKING CONTROL METHOD

(75) Inventor: Hideki Ishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 10/478,220

(22) PCT Filed: May 23, 2002

(86) PCT No.: PCT/JP02/04986

§ 371 (c)(1),
(2), (4) Date: Nov. 28, 2003

(87) PCT Pub. No.: WO02/097805

PCT Pub. Date: Dec. 5, 2002

(65) Prior Publication Data

US 2004/0151084 A1    Aug. 5, 2004

(30) Foreign Application Priority Data

May 28, 2001  (JP)  ............................. 2001-158554

(51) Int. Cl.
*G11B 7/00*  (2006.01)
(52) U.S. Cl. ................... 369/44.29; 369/44.37; 369/44.41

(58) Field of Classification Search ............. 369/44.29, 369/44.35, 44.36, 44.37, 44.41, 44.28
See application file for complete search history.

(56) References Cited

U.S. PATENT DOCUMENTS

| 4,689,779 A | * | 8/1987 | Hayashi et al. ........... 369/44.32 |
| 5,084,849 A | * | 1/1992 | Ishii et al. ............... 369/44.35 |
| 6,388,983 B1 | * | 5/2002 | Kikuchi ..................... 720/710 |

FOREIGN PATENT DOCUMENTS

| JP | 9-288831 | 11/1997 |
| JP | 2000-3525 | 1/2000 |
| JP | 2000-251274 | 9/2000 |

* cited by examiner

*Primary Examiner*—Thang V. Tran
*Assistant Examiner*—Lixi Chow
(74) *Attorney, Agent, or Firm*—Oblon, Spivak, McClelland, Maier & Neustadt, P.C.

(57) ABSTRACT

In a configuration in which side beams scan in positions that are offset with respect to a main beam by approximately $(¼+n)P$ or $(¾+n)P$ in the radial direction of an optical disk, a differential signal is generated from push-pull signals of the return lights of the side beams to generate a track-cross signal. In a configuration in which side beams scan in positions that are offset with respect to a main beam by approximately $(¼+n)P$ or $(¾+n)P$ in the radial direction of an optical disk, far-side or near-side light detection results of the return lights of the side beams are processed and computed with respect to a push-pull signal of the return light of the main beam.

7 Claims, 7 Drawing Sheets

OPTICAL DISC APPARATUS AND TRACKING CONTROL METHOD

BACKGROUND OF INVENTION

1. Technical Field

The present invention relates to an optical disk apparatus and a tracking control method, which is applied, for example, to an optical disk apparatus for DVDs to reliably generate a track-cross signal.

2. Background Art

In optical disk apparatuses such as DVD-R and DVD±RW in the related art, a tracking error signal is generated using a so-called differential push-pull technique.

FIG. 1 is a connection diagram for illustrating return-light processing for use in the differential push-pull technique. FIG. 1 shows accessing of an optical disk by means of land recording or groove recording, in which lands L and grooves G having substantially the same width are formed. An optical disk apparatus converts a laser beam remitted from a semiconductor laser into −1 order, 0 order, and +1 order diffracted lights using a diffraction grating, and the −1 order, 0 order, and +1 order diffracted lights are irradiated onto an information recording surface of the optical disk by an objective lens. The return lights of the diffracted lights are received by predetermined light-receiving devices.

In the optical disk apparatus, the optical system is configured so that, when a beam spot of a main beam formed of the 0 order diffracted light scans on the center of an accessed track on an information recording surface of an optical disk 1, beam spots formed of the −1 order and +1 order diffracted lights, which are side beams with respect to the main beam, scan in positions that are separated in an inner-outer circumferential direction, on sides where the scanning of the main beam starts and ends, by approximately a half track pitch in the radial direction of the optical disk 1. In the following description, the center-to-center spacing between adjacent lands L or the center-to-center spacing between adjacent grooves G is referred to as one track pitch.

In the optical disk apparatus, the return light of the main beam is received by a light-receiving device 2M having a light-receiving surface divided by dividing lines extending in directions corresponding to the radial and circumferential directions of the optical disk 1. The return lights of the side beams are received by light-receiving devices 2S1 and 2S2 each having a light-receiving surface divided by a dividing line extending in a direction corresponding to the circumferential direction of the optical disk 1.

In the optical disk apparatus, subtracting circuits 3 and 4 are used to generate push-pull signals (signals indicated by reference numerals PPs1=F−E and PPs2=H−G in the figure) in the light-receiving devices 2S1 and 2S2 for the side beams, respectively. Also, a push-pull signal (a signal indicated by reference numeral PPm=(A+D)−(B+C) in the figure) in the light-receiving device 2M for the main beam is generated using adding circuits 5 and 6 and a subtracting circuit 7. The push-pull signals PPs1 and PPs2 of the side beams are 180° out of phase with respect to the push-pull signal PPm of the main beam. If an offset is produced in the push-pull signal PPm of the main beam due to lens shifting of the objective lens in the radial direction, disk tilting of the optical disk in the radial direction, and the like, an in-phase offset is produced in the push-pull signals PPs1 and PPs2 of the side beams.

In the optical disk apparatus, therefore, the push-pull signals PPs1 and PPs2 of the side beams are summed by an adding circuit 8, after which the summation result is amplified by a predetermined gain k in an amplifier circuit 9. Subsequently, in a subtracting circuit 10, the result is subtracted from the push-pull signal PPm of the main beam to generate a tracking error signal TE expressed by TE=((A+D)−(B+C))−k((F−E)+(H−G)) so as to prevent an offset from being produced. This tracking error signal is input to a DSP (Digital Signal Processor) in the optical disk apparatus, and the objective lens is made movable, thereby performing tracking control.

In the optical disk apparatus, furthermore, the output signals of the adding circuits 5 and 6 are summed by an adding circuit 11, whose bottom value is then detected by a bottom detecting circuit 12 serving as an envelope detector circuit to generate a track-cross signal TCS expressed by (A+D+B+C). The track-cross signal TCS is a discriminating signal between the lands and the grooves, whose signal level changes so as to be 90° out of phase with respect to the tracking error signal TE, as shown in FIG. 2, as the optical disk moves in the radial direction.

In the optical disk apparatus, the tracking error signal TE and the track-cross signal TCS are digitized for processing, thus allowing the number of tracks which an optical pickup traverses during seeking to be counted and a tracking servo circuit to be activated based on the relationship between the tracking error signal TE and the track-cross signal TCS.

With recent demands for high-density optical disks, the track pitch of the optical disks becomes narrower so as to increasingly achieve substantially a one-to-one ratio of the groove width to the land width. Accordingly, the information recording surface becomes thinner in order to improve the jitter in the playback signal. Therefore, recent optical disks tend to have a reduced difference in reflectance between lands and grooves in an unrecorded portion.

In this case, in a recorded portion where pits have been formed, a relatively large difference in level of the track-cross signal TCS is exhibited between the grooves and the lands; on the other hand, a small difference in level between the grooves and the lands is detected in an unrecorded portion where no pits are formed.

In the related art, therefore, a method for generating a track-cross signal has suffered from a problem in that it is difficult to detect a track-cross signal in an unrecorded portion of an optical disk capable of large-capacity recording, such as a DVD. The track-cross signal is adapted to discriminate between grooves and lands, and is used with the tracking error signal for a tracking servo closing operation, and the like. If it is difficult to detect the track-cross signal TCS, a track-search operation becomes unstable in an unrecorded portion, leading to unstable starting of tracking control and the like.

BACKGROUND OF INVENTION

The present invention has been made in view of the foregoing points, and is intended to propose an optical disk apparatus capable of reliably generating a track-cross signal even in an optical disk capable of large-capacity recording such as a DVD.

The above-described object is achieved by the present invention through the provision of an optical disk apparatus in which, if the track pitch between lands, where a track is formed of a land, or the track pitch between grooves, where a track is formed of a groove, is indicated by P, side beams scan in positions that are offset with respect to a main beam by approximately (¼+n)P or (¾+n)P in the radial direction of the optical disk; light-receiving means includes a light-receiving surface for receiving the return lights of the side beams, which is divided into first and second light-receiving regions by a dividing line corresponding to the direction in which the track extends, and a light-receiving surface for receiving the return light of the main beam, which is divided into third and fourth light-receiving regions by a dividing line corresponding to at least the direction in which the track extends; and signal processing means includes first subtracting means for generating a differential signal between light detection results obtained from the first and second light-receiving regions to generate a track-cross signal; second subtracting means for generating a differential signal between light detection results obtained from the third and fourth light-receiving regions; band-limiting means for removing a traverse component from the light detection result of a light-receiving region of the first and second light-receiving regions which is far from the third and fourth light-receiving regions; amplifying means for amplifying an output signal of the band-limiting means with a predetermined gain; and computing means for computing an output signal of the amplifying means with respect to an output signal of the second subtracting means so that, for each of the side beams, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal.

In the configuration of the present invention, therefore, the side beams scan in positions that are offset with respect to the main beam by approximately ($\frac{1}{4}$+n)P or ($\frac{3}{4}$+n)P in the radial direction of the optical disk; and a differential signal between light detection results obtained from the first and second light-receiving surfaces is generated to generate a track-cross signal, whereby, even when there is a small distance in reflectance between a land and a groove, the track-cross signal can be obtained because the amplitude is great. Therefore, a track-cross signal can be reliably generated in an optical disk capable of large-capacity recording, such as a DVD. Furthermore, the provision of second subtracting means for generating a differential signal between light detection results obtained from the third and fourth light-receiving regions, band-limiting means (low-pass filter) for removing a traverse component from the light detection result of a light-receiving region of the first and second light-receiving regions which is far from the third and fourth light-receiving regions, amplifying means for amplifying an output signal of the band-limiting means with a predetermined gain, and means for computing an output signal of the amplifying means with respect to an output signal of the second subtracting means so that, for each of the side beams, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal can effectively avoid occurrence of an offset voltage, and can further effectively avoid a change in signal level if the side beams scan in positions that are offset with respect to the main beam by approximately ($\frac{1}{4}$+n)P or ($\frac{3}{4}$+n)P in the radial direction of the optical disk, thus generating a tracking error signal.

The above-described object is further achieved by the present invention through the provision of a tracking control method in which, if the track pitch between lands, where a track is formed of a land, or the track pitch between grooves, where a track is formed of a groove, is indicated by P, a side beam scans in a position that is offset with respect to a main beam by approximately ($\frac{1}{4}$+n)P or ($\frac{3}{4}$+n)P in the radial direction of the optical disk; the return light of the side beam is received at a light-receiving surface which is divided into first and second light-receiving regions by a dividing line corresponding to the direction in which the track extends, and the return light of the main beam is received at a light-receiving surface which is divided into third and fourth light-receiving regions by a dividing line corresponding to at least the direction in which the track extends; a differential signal between light detection results obtained from the first and second light-receiving regions is generated to generate a track-cross signal; a differential signal between light detection results obtained from the third and fourth light-receiving regions is generated; a traverse component is removed from the light detection result of a light-receiving region of the first and second light-receiving regions which is far from the third and fourth light-receiving regions, and the result is amplified with a predetermined gain; and the result is computed with respect to the differential signal between the light detection results obtained from the third and fourth light-receiving regions so that, for each side beam, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal.

According to the present invention, therefore, a tracking control method can be achieved in which a track-cross signal can be reliably generated in an optical disk capable of large-capacity recording, such as a DVD, and a suitable tracking error signal can be further generated for such a configuration, thereby achieving stable seeking and other processing.

The above-described object is further achieved by the present invention through the provision of an optical disk apparatus in which, if the track pitch between lands, where a track is formed of a land, or the track pitch between grooves, where a track is formed of a groove, is indicated by P, a side beam scans in a position that is offset with respect to a main beam by approximately ($\frac{1}{4}$+n)P or ($\frac{3}{4}$+n)P in the radial direction of the optical disk; light-receiving means includes a light-receiving surface for receiving the return light of the side beam, which is divided into first and second light-receiving regions by a dividing line corresponding to the direction in which the track extends, and a light-receiving surface for receiving the return light of the main beam, which is divided into third and fourth light-receiving regions by a dividing line corresponding to at least the direction in which the track extends; and signal processing means includes first subtracting means for generating a differential signal between light detection results obtained from the first and second light-receiving regions to generate a track-cross signal; second subtracting means for generating a differential signal between light detection results obtained from the third and fourth light-receiving regions; band-limiting means for removing a traverse component from the light detection result of a light-receiving region of the first and second light-receiving regions which is near the third and fourth light-receiving regions; amplifying means for amplifying an output signal of the band-limiting means with a predetermined gain; and computing means for computing an output signal of the amplifying means with respect to an output signal of the second subtracting means so that, for each side beam, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal.

According to the configuration of the present invention, the side beam scans in position that is offset with respect to the main beam by approximately (¼+n)P or (¾+n)P in the radial direction of the optical disk; and a differential signal between light detection results obtained from the first and second light-receiving surfaces is generated to generate a track-cross signal, whereby, even when there is a small distance in reflectance between a land and a groove, the track-cross signal can be obtained because the amplitude is great. Therefore, a track-cross signal can be reliably generated in an optical disk capable of large-capacity recording, such as a DVD. Furthermore, the provision of second subtracting means for generating a differential signal between light detection results obtained from the third and fourth light-receiving regions, band-limiting means (low-pass filter) for removing a traverse component from the light detection result of a light-receiving region of the first and second light-receiving regions which is near the third and fourth light-receiving regions, amplifying means for amplifying an output signal of the band-limiting means with a predetermined gain, and means for computing an output signal of the amplifying means with respect to an output signal of the second subtracting means so that, for each side beam, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal can effectively avoid occurrence of an offset voltage, and can further effectively avoid a change in signal level if the side beam scans in position that is offset with respect to the main beam by approximately (¼+n)P or (¾+n)P in the radial direction of the optical disk, thus generating a tracking error signal.

The above-described object is further achieved by the present invention through the provision of a tracking control method in which, if the track pitch between lands, where a track is formed of a land, or the track pitch between grooves, where a track is formed of a groove, is indicated by P, a side beam scans in a position that is offset with respect to a main beam by approximately (¼+n)P or (¾+n)P in the radial direction of the optical disk; the return light of the side beam is received at a light-receiving surface which is divided into first and second light-receiving regions by a dividing line corresponding to the direction in which the track extends, and the return light of the main beam is received at a light-receiving surface which is divided into third and fourth light-receiving regions by a dividing line corresponding to at least the direction in which the track extends; a differential signal between light detection results obtained from the first and second light-receiving regions is generated to generate a track-cross signal; a differential signal between light detection results obtained from the third and fourth light-receiving regions is generated; a traverse component is removed from the light detection result of a light-receiving region of the first and second light-receiving regions which is near the third and fourth light-receiving regions, and the result is amplified with a predetermined gain; and the result is computed with respect to the differential signal between the light detection results obtained from the third and fourth light-receiving regions so that, for each side beam, the light detection result of a light-receiving region of the first and second light-receiving regions which is far from the third and fourth light-receiving regions and the light detection result of a light-receiving region of the third and fourth light-receiving regions which is far from the first and second light-receiving regions are summed to generate a tracking error signal.

According to the present invention, therefore, a tracking control method can be achieved in which a track-cross signal can be reliably generated in an optical disk capable of large-capacity recording, such as a DVD, and a suitable tracking error signal can be further generated for such a configuration, thereby achieving stable seeking and other processing.

BEST MODE FOR CARRYING OUT THE INVENTION

A detailed description of embodiments of the present invention is made below with reference to the drawings, as required.

(1) First Embodiment (1-1) Configuration of the First Embodiment

Figure 3:
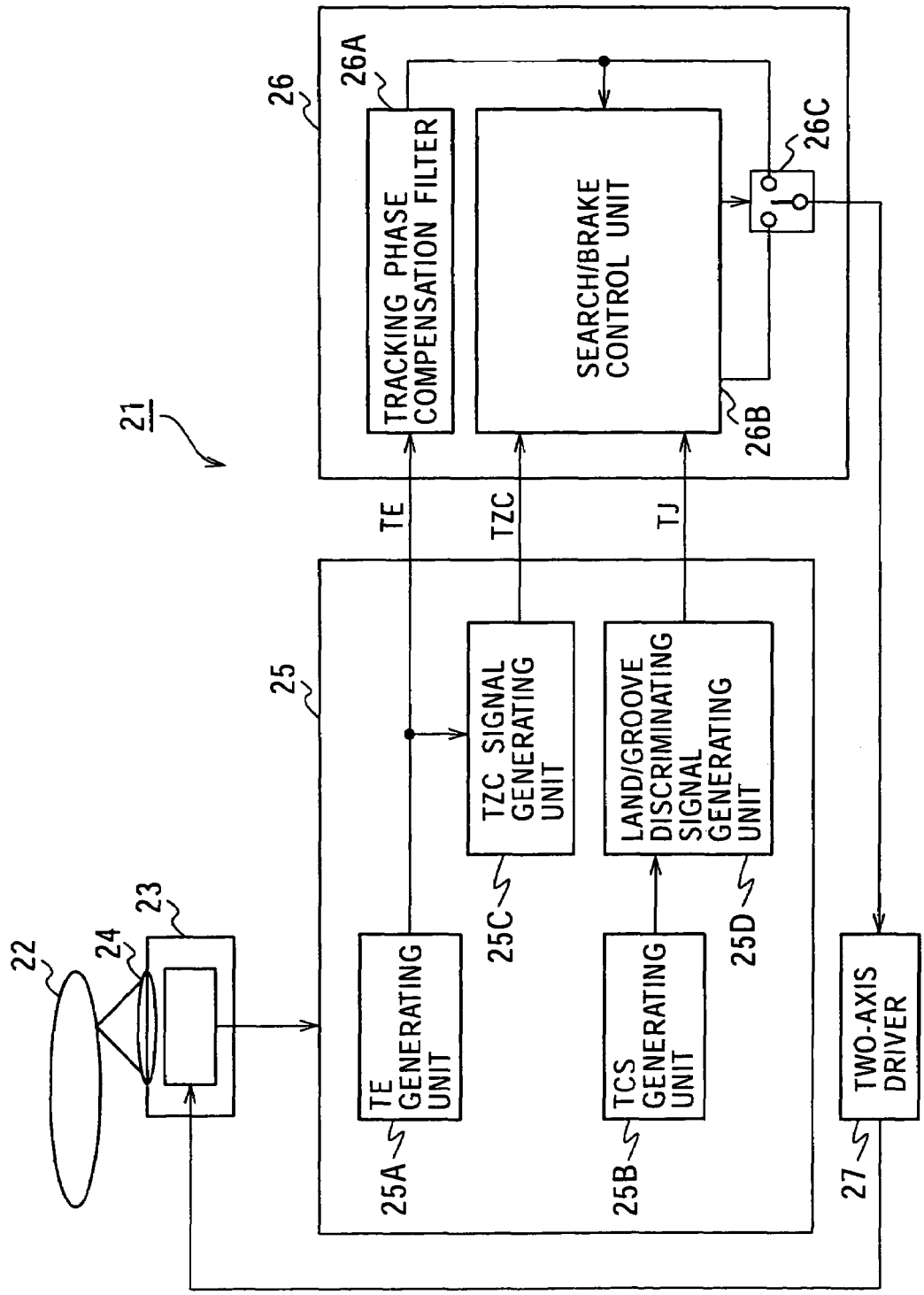
FIG. 3 is a block diagram showing an optical disk apparatus according to a first embodiment of the present invention.

FIG. 3 is a block diagram showing an optical disk apparatus according to a first embodiment of the present invention. In this optical disk apparatus 21, an optical disk 22 is an optical disk capable of high-density recording, such as a DVD, and is rotated by a spindle motor (not shown) at a predetermined rotational speed.

An optical pickup 23 uses a diffraction grating to convert a laser beam emitted from a semiconductor laser into −1 order, 0 order, and +1 order diffracted lights, and an objective lens 24 focuses the diffracted lights onto an information recording surface of the optical disk 22. The optical pickup 23 further guides the return lights of the diffracted lights to predetermined light-receiving devices through the objective lens 24, and outputs the light detection results of the light-receiving devices, which have been subjected to current-to-voltage conversion, to a matrix amplifier 25. The optical pickup 23 is structured such that a predetermined two-axis actuator is driven according to the light detection results obtained by the light-receiving devices to make the objective lens 24 movable, thus allowing tracking control and focus control. The optical pickup 23 is further adapted so that a driving circuit (not shown) causes the laser beam irradiating the optical disk 22 to be emitted in an intermittent manner according to the data to be recorded, thus allowing the desired data to be recorded on the optical disk 22.

The matrix amplifier 25 computes the light detection results output from the optical pickup 23 to generate a tracking error signal TE, a focus-error signal, a playback signal, and a track-cross signal TCS. The matrix amplifier 25 further digitizes the tracking error signal TE to generate a track-zero-cross signal TZC whose signal level is switched every time the track center is traversed during seeking. Furthermore, the track-cross signal TCS is digitized to generate a discriminating signal TJ between lands and grooves. Thus, the matrix amplifier 25 includes a tracking error signal generating unit (TE generating unit) 25A, a track-cross generating unit (TCS generating unit) 25B, a track-zero-cross signal generating unit (TZC signal generating unit) 25C, and a land/groove discriminating signal generating unit 25D.

Upon receipt of the tracking error signal TE from the matrix amplifier 25, the DSP 26 computes the tracking error signal TE after subjected to analog-to-digital conversion, and compensates for the phase of the tracking error signal TE. The DSP 26 drives the two-axis driver 27 so that the phase compensation result becomes a predetermined signal level, thus allowing the objective lens 24 to move in response to the tracking error signal TE to perform tracking control. Therefore, the DSP 26 includes a phase compensation filter 26A for tracking error signals.

The DSP 26 further generates a driving signal for driving a seeking mechanism (not shown) according to a track jump instruction or the like from a controller (not shown), and causes the optical pickup 23 to seek over the inner and outer circumferences of the optical disk 22 according to the driving signal. According to instructions from the controller, the DSP 26 stops driving the two-axis driver 27 in response to the tracking error signal TE, and drives the two-axis driver 27 in response to a predetermined driving signal. In response to this driving signal, the two-axis driver 27 is driven so as to rapidly seek a target track in cooperation with the driven seeking mechanism while counting the number of tracks traversed in response to the track-cross signal TCS or the track-zero-cross signal TZC, and monitoring the seek results.

In the case of a short track jump, the DSP 26 stops driving the seeking mechanism, if necessary, to perform the track jump processing only by driving the two-axis driver 27. After track jumping, the DSP 26 closes a tracking servo on the lands or grooves according to the relationship between the track-zero-cross signal TZC and the discriminating signal TJ. If it is not successful in closing the tracking servo, a braking operation is performed according to the relationship between the track-zero-cross signal TZC and the discriminating signal TJ so as to suppress vibration of the objective lens 24. Therefore, the DSP 26 includes a search/brake control unit 26B for generating a driving signal for the two-axis driver 27 during seeking or braking, and a selecting circuit 26C for switching driving of the two-axis driver 27 between the driving signal by the seek/brake control unit 26B and the driving signal according to the tracking error signal TE according to the track-zero-cross signal TZC and the discrimination signal TJ.

Figure 4:
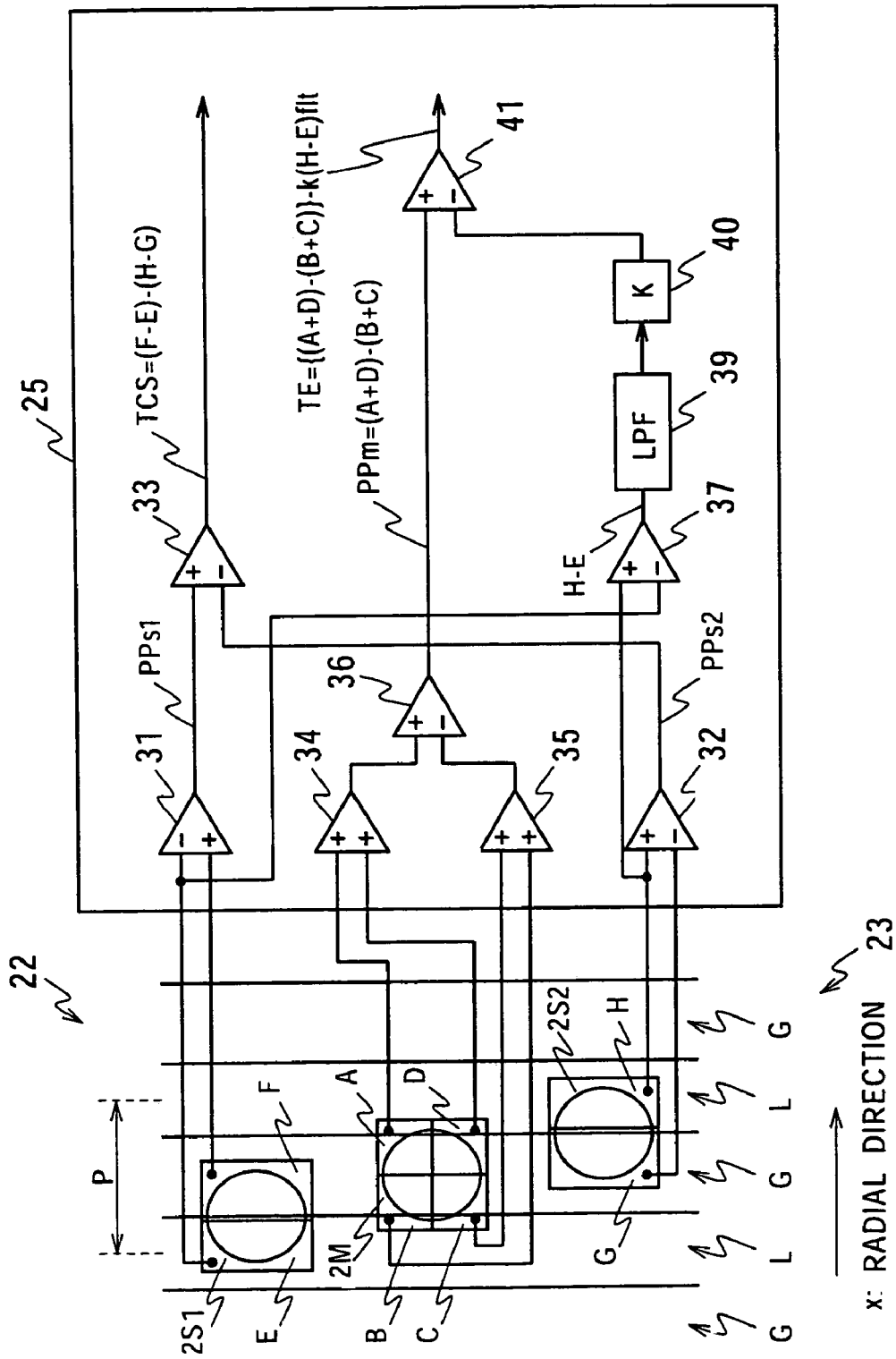
FIG. 4 is a connection diagram showing a matrix amplifier together with peripheral components in the optical disk apparatus shown in FIG. 3.

FIG. 4 is a connection diagram showing the optical pickup 23 and the matrix amplifier 25 together with peripheral components. In this embodiment, the optical disk 22 is set so that the lands L and the grooves G have substantially the same width, and is further set so as to be capable of land recording and groove recording.

In the optical pickup 23, the optical system is configured so that, when a beam spot of the main beam formed of the 0 order diffracted light scans on the center of an accessed track on the information recording surface of the optical disk 22, beam spots formed of the −1 order and +1 order diffracted lights, which are side beams with respect to the main beam, scan in positions that are offset, on sides where the scanning of the main beam starts and ends, by approximately (¼+n) track pitches in the inner-outer circumferential direction of the optical disk 22, where n is an integer which is set to a value of zero in this embodiment.

In the optical pickup 23, therefore, when the beam spot of the main beam scans on the center of an accessed track, the beam spots of the side beams scan substantially about the edge of the land L or groove G scanned by the main beam.

Figure 1:
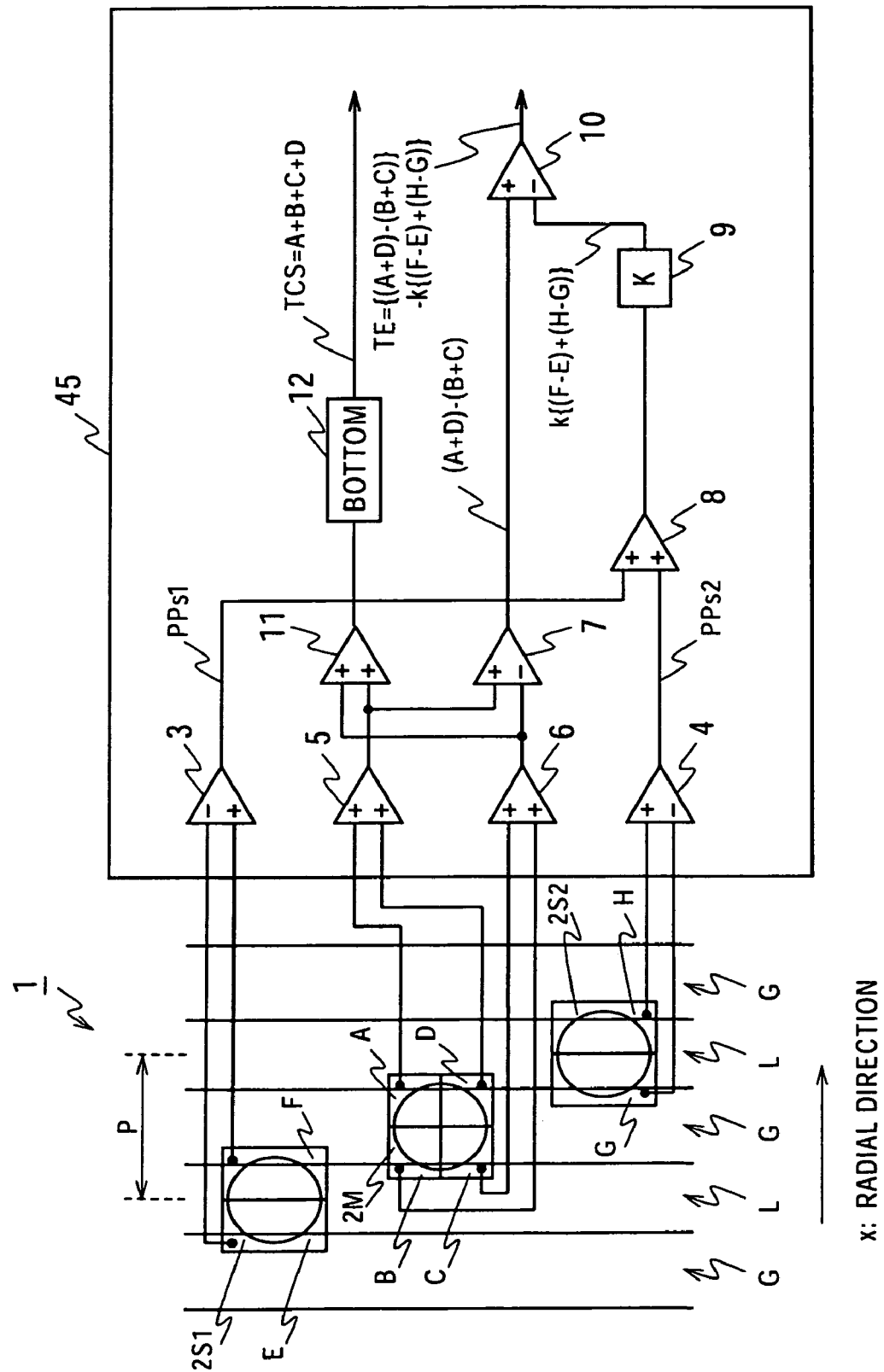
FIG. 1 is a connection diagram showing a matrix amplifier together with peripheral components in an optical disk apparatus in the related art.
Figure 2:
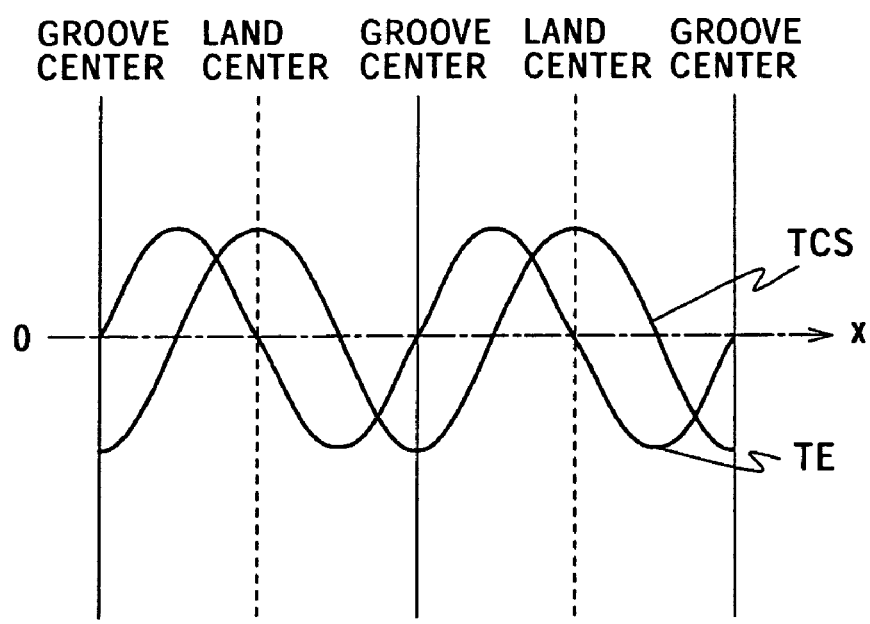
FIG. 2 is a characteristic curve diagram showing the relationship between a track-cross signal and a tracking error signal.

The optical pickup 23 receives the return lights of the main beam and side beams by means of the light-receiving devices 2M, 2S1, and 2S2 similar to those described above with reference to FIG. 1, and outputs light detection results from light-receiving regions A to G of the light-receiving devices 2M, 2S1, and 2S2. Thus, the light-receiving devices 2S1 and 2S2 which receive the side beams is structured so that, when the beam spot of the main beam scans on the center of an accessed track, an extending lines by which each of the light-receiving surfaces is divided scans on the edge of the scanned land L or groove G.

The matrix amplifier 25 generates a push-pull signal (a signal indicated by reference numeral PPs1=F−E in FIG. 4) by means of a subtracting circuit 31 from the two light detection results of the light-receiving device 2S1 which receives one of the side beams. The matrix amplifier 25 further generates a push-pull signal (a signal indicated by reference numeral PPs2=H−G in FIG. 4) by means of a subtracting circuit 32 from the two light detection results of the light-receiving device 2S2 which receives the other side beam.

The matrix amplifier 25 processes the two push-pull signals PPs1 and PPs2 so that the light-receiving regions on the main beam side are summed and the light-receiving regions on the opposite side to the main beam side are summed, thereby generating the track-cross signal TCS. That is, the matrix amplifier 25 subtracts the push-pull signal PPs2 from the push-pull signal PPs1 by means of a subtracting circuit 33 to generate the track-cross signal TCS expressed by TCS=(F−E)−(H−G).

Letting the radial movable range of the optical pickup 23 be indicated by x, the push-pull signals PPs1 and PPs2 have varying signal levels, as given by the following expressions:

$$PPs1 = \frac{B}{2}\sin\left(\frac{2\pi x}{p} - \frac{\pi}{2}\right) = -\frac{B}{2}\cos\left(\frac{2\pi x}{p}\right) \quad (1)$$

$$PPs2 = \frac{B}{2}\sin\left(\frac{2\pi x}{p} + \frac{\pi}{2}\right) = \frac{B}{2}\cos\left(\frac{2\pi x}{p}\right) \quad (2)$$

where p denotes the track pitch.

Figure 5:
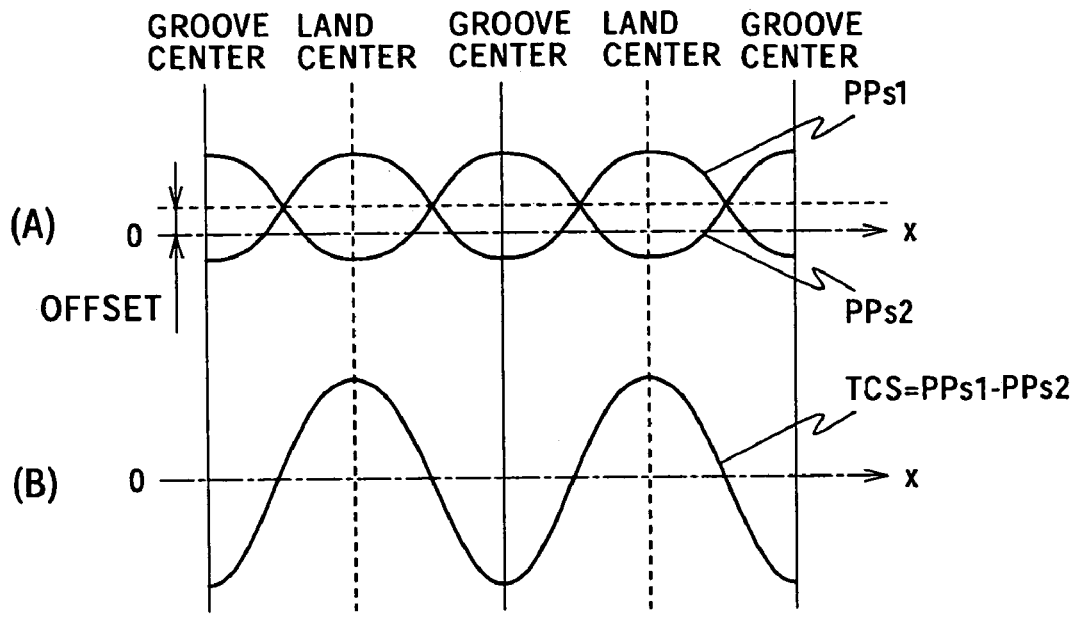
FIGS. 5(A) and 5(B) are characteristic curve diagrams for illustrating a track-cross signal.

Therefore, as shown in FIG. 5(A), the signal levels of the push-pull signals PPs1 and PPs2 vary in a sine-wave fashion as the optical disk 22 moves in the radial direction, thus producing in-phase offsets. The track-cross signal TCS obtained from a differential signal between the push-pull signals PPs1 and PPs2 is expressed by the following equation, and, as shown in FIG. 5(B), the offsets produced in the push-pull signals PPs1 and PPs2 can be cancelled as the objective lens 24 moves in the radial direction:

$$TCS = PPs1 - PPs2 = -B\cos\left(\frac{2\pi x}{p}\right) \quad (3)$$

In this embodiment, therefore, the side beams are shifted with respect to the main beam by a quarter track pitch in the radial direction of the optical disk 22; the return lights of the side beams are received by light-receiving devices 2S1 and 2S2 each having a light-receiving surface divided in the direction in which the track extends; and a differential signal between the push-pull signals of the light-receiving devices 2S1 and 2S2 is generated so that the light detection results of the nea light-receiving regions of the light-receiving devices 2S1 and 2S2 are summed, thereby generating a land-groove discriminating signal.

Meanwhile, if the side beams are placed in positions that are shifted with respect to the main beam by a quarter track pitch in the radial direction of the optical disk 22, during writing, while pat patterns are formed by the main beam, one of the side beams scans in part on the track prior to the main beam, and the other side beam scans on the track in which pit patterns have been just formed. Therefore, an offset would be produced during writing in a tracking error signal generated using the differential push-pull technique.

In this case, it has been further found that a tracking error signal generated using the differential push-pull technique would have a strongly varying amplitude due to a deviation of the central axis of rotation of the optical disk 22 with respect to the transmission axis of the optical pickup 23, and tilting of the optical disk 22.

In this embodiment, therefore, in the matrix amplifier 25, an adding circuit 34 sums the light detection results A and D obtained from the light-receiving surfaces on the outer circumference of the light-receiving device 2M which receives the main beam, and an adding circuit 35 sums the light detection results B and C obtained from the light-receiving surfaces on the inner circumference thereof. A subtraction is performed by a subtracting circuit 36 on the summation results obtained by the two adding circuits 34 and 35, thereby generating a push-pull signal PPm of the main beam expressed by (A+D)−(B+C).

Figure 6:
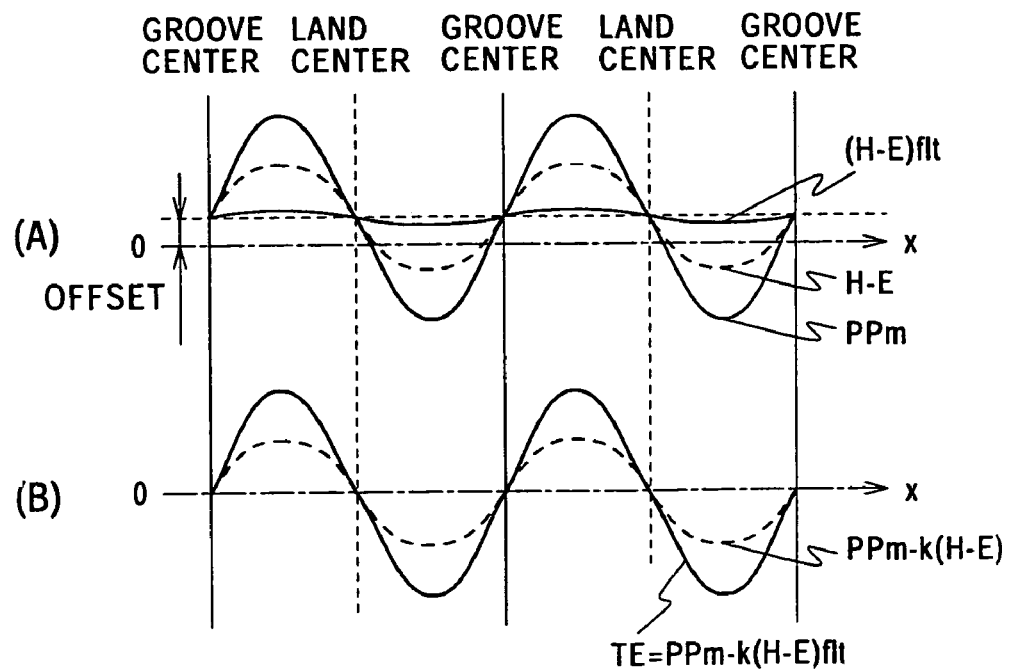
FIGS. 6(A) and 6(B) are characteristic curve diagrams for illustrating a tracking error signal.

The push-pull signal PPm of the main beam has a varying signal level expressed by the following expression as the optical pickup 23 moves in the radial direction, as depicted in the characteristic curve shown in FIG. 6(A):

$$PPm = A\sin(2\pi x/p) \quad (4)$$

The matrix amplifier 25 further generates a differential signal (H−E) by means of a subtracting circuit 37 for the light detection results obtained from the light-receiving regions E and H of the light-receiving devices 2S1 and 2S2 that receive the side beams which reside on the far side of the main beam (on groove side if the main beam scans on a land).

In the push-pull signal PPm of the main beam, an offset is produced, as shown in FIG. 6(A), as the objective lens 24 shifts in the radial direction. An in-phase offset is also produced in the differential signal (H−E). Therefore, it can be thought that the signal level of the push-pull signal PPm is corrected for by the differential signal (H−E) to prevent this type of offset.

In the differential signal (H−E), however, as shown in FIG. 6(A), the signal level varies in phase or in reverse phase (out of phase depending upon the direction in which the central axis of rotation of the optical disk 22 is deviated with respect to the transmission axis of the objective lens 22) with respect to the push-pull signal PPm of the main beam, when traversed, due to a deviation of the rotational center of the optical disk 22 with respect to the transmission axis of the objective lens, and tilting of the optical disk 22 (this indicates superposition of a traverse signal). Thus, the signal level of the differential signal (H−E) varies due to a deviation of the optical disk 22, etc. Although the differential signal (H−E) can correct for the signal level of the push-pull signal PPm to prevent this type of offset, the signal level changes.

Therefore, the matrix amplifier 25 uses a low-pass filter (LPF) 39 to band-limit the differential signal (H−E) to extract only an offset component. Subsequently, in an amplifier circuit 40, an output signal of the low-pass filter 39 is amplified by a predetermined gain k. Then, in a subtracting circuit 41, an output signal of the amplifier circuit 40 is subtracted from the push-pull signal PPm so that the light detection results of the far light-receiving regions between the light-receiving regions A to D used to generate the push-pull signal PPm and the light-receiving regions H and E used to generate the differential signal (H−E) are summed. Then, as shown in FIG. 6(B), a tracking error signal TE given by the following equation is generated:

$$TE = \{(A+D)-(B+C)\}-k(H-E)flt \quad (5)$$

where flt indicates the band-limiting performed by the low-pass filter 39.

(1-2) Operation of the First Embodiment

In the foregoing configuration, in the optical disk apparatus 21 (FIGS. 3 and 4), the side beams are set so as to be offset, on sides where the scanning of the main beam starts and ends, with respect to the main beam emitted from the optical pickup 23 by a quarter track pitch in the inner-outer circumferential direction of the optical disk 22, and the main beam and the side beams are irradiated onto the optical disk 22. The return lights of the main beam and the side beams are received by the light-receiving device 2M and the light-receiving devices 2S1 and 2S2, respectively.

The light-receiving device 2M and the light-receiving devices 2S1 and 2S2 each have a light-receiving surface divided by a dividing line extending in a direction corresponding to the direction in which the track extends on the optical disk 22. The light-receiving surface of the light-receiving device 2M for the main beam is further divided by a dividing line extending in a direction corresponding to the radial direction of the optical disk 22. The light detection results obtained from the thus divided light-receiving regions are input to the matrix amplifier 25 after being subjected to current-to-voltage conversion.

For the light detection results, push-pull signals PPs1 and PPs2 are generated from the light detection results E and F, and G and H obtained from the side beams, respectively, and a subtraction is performed on the push-pull signals PPs1 and PPs2 so that the light detection results F and G of the near light-receiving regions are summed and the light detection results E and H of the far light-receiving regions are summed in the light-receiving devices 2S1 and 2S2, thereby generating a track-cross signal TCS.

In the thus generated track-cross signal TCS, a large signal level can be achieved as the optical pickup 23 shifts in the radial direction of the disk even when there is a small difference in reflectance between a land and a groove, because the side beams are set so as to be offset with respect to the main beam by a quarter track pitch in the inner-outer circumferential direction of the optical disk 22. In this embodiment, therefore, a track-cross signal can be reliably generated in an optical disk capable of large-capacity recording, such as a DVD, resulting in stable seeking control and tracking control, and therefore stable random access processing and the like.

However, if the side beams are set so as to be offset with respect to the main beam by a quarter track pitch in the inner-outer circumferential direction of the optical disk 22, the conventional differential push-pull technique may cause an offset during writing, and may provide a strongly varying amplitude due to tilting of the optical disk 22 and the like.

In this embodiment, therefore, a push-pull signal PPm is generated from light detection results of the main beam. A differential signal (H−E) is further generated from light detection results of the side beams, i.e., from the light detection results E and H obtained from the light-receiving regions which are far from the main beam, and only an offset component is extracted from the differential signal (H−E) through band-limiting by the low-pass filter 39. Thus, a traverse component superposed on the differential signal (H−E) can be suppressed, after which the signal level of the differential signal (H−E)flt is corrected for by the amplifier circuit 40.

In the optical disk apparatus 21, a subtraction is performed between the push-pull signal PPm and the differential signal (H−E)flt so that the light detection results obtained from the light-receiving regions which are far from the light-receiving regions of the main beam are summed, thereby correcting for the signal level of the push-pull signal PPm. Thus, the offset of the push-pull signal PPm as the objective lens 24 shifts in the radial direction can be suppressed, and a tracking error signal TE is generated.

In the optical disk apparatus 21, the two-axis driver 27 is driven by the DSP 26 according to the thus generated tracking error signal TE, thus performing tracking control on the optical pickup 23. In response to the tracking error signal TE, a track-zero-cross signal TZC whose signal level switches every time the main beam traverses the track center is generated, and the track-cross signal TCS is digitized to generate a discriminating signal TJ between lands and grooves. In the optical disk apparatus 21, when seeking and track jump instructions are given by a controller (not shown), the discriminating signal TJ and the track-zero-cross signal TZC are monitored to drive a sled mechanism in the DSP 26, and driving of the two-axis driver 27 in response to the tracking error signal TE is switched to driving in response to a predetermined driving signal. When seeking and track jumping to a target track have been performed, it is determined, based on the relationship between the track-zero-cross signal TZC and the discriminating signal TJ, whether the target track is a groove or a land, and the tracking servo is closed to start driving the two-axis driver 27 in response to the tracking error signal TE.

In the optical disk apparatus 21, the tracking error signal TE and the track-cross signal TCS which are reference signals of tracking and seeking control can be stably generated even in the optical disk 22 capable of high-density recording, resulting in stable and reliable tracking control and seeking control. Furthermore, random access processing or the like can also be stably and reliably performed.

(1-3) Advantages of the First Embodiment

In the foregoing configuration, side beams scan in positions that are offset with respect to a main beam by approximately (¼+n) P in the radial direction of an optical disk, and a differential signal is generated from push-pull signals of the return lights of the side beams to generate a track-cross signal. Therefore, the track-cross signal can be reliably generated even in an optical disk capable of large-capacity recording, such as a DVD.

Furthermore, the configuration is such that side beams scan in positions that are offset with respect to a main beam by approximately (¼+n)P in the radial direction of an optical disk, and the far-side light detection results of the return lights of the side beams are processed and subtracted from a push-pull signal of the return light of the main beam, thereby making it possible to reliably generate a track-cross signal. A suitable tracking error signal TE can be generated for this configuration.

(2) Second Embodiment

Figure 7:
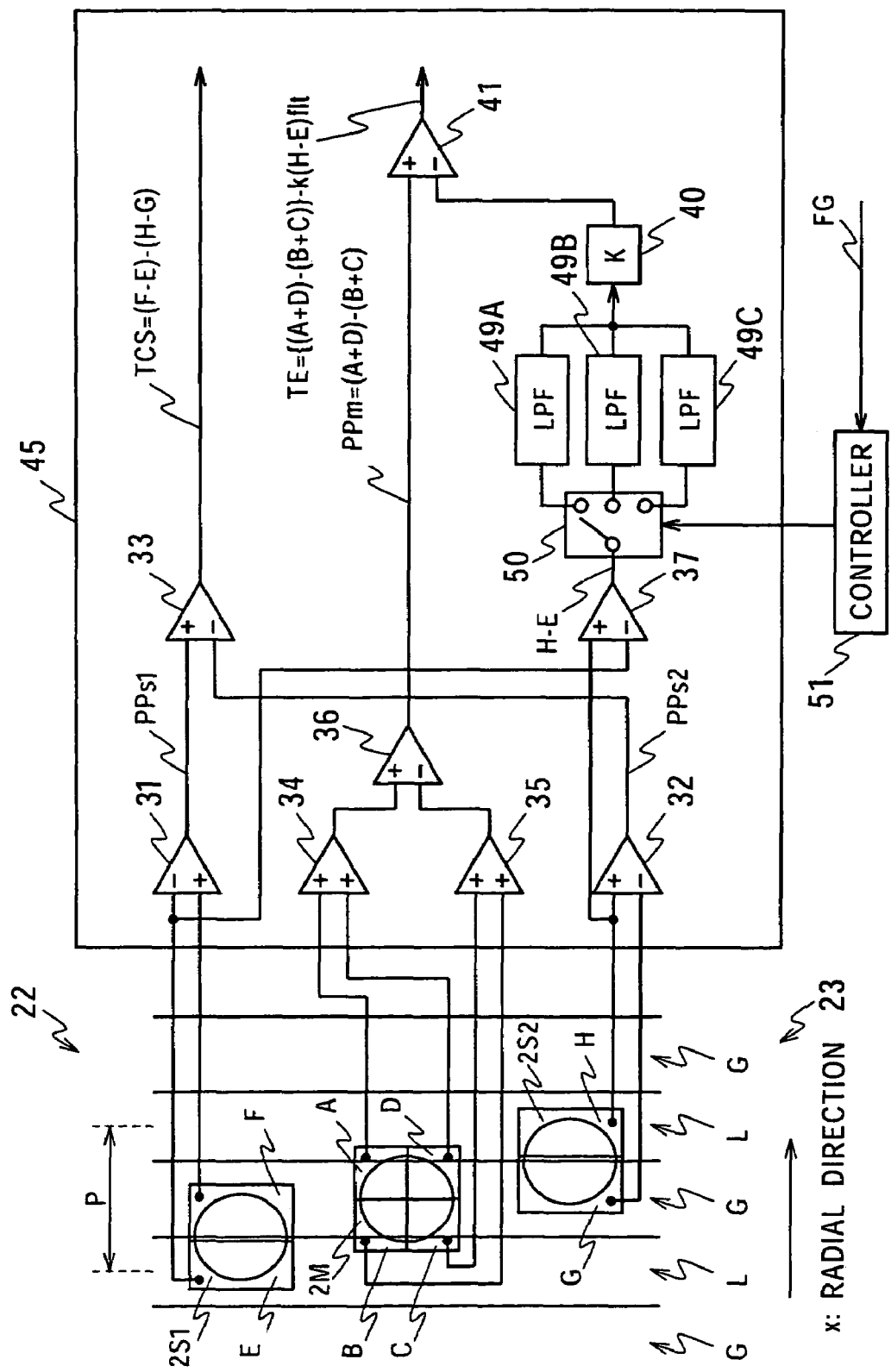
FIG. 7 is a connection diagram showing a matrix amplifier together with peripheral components in an optical disk apparatus according to a second embodiment of the present invention.

FIG. 7 is a connection diagram showing a matrix amplifier 45 used in an optical disk apparatus according to a second embodiment of the present invention together with the relevant components, in comparison to that shown in FIG. 4. Except for the matrix amplifier 45 and the relevant components, the optical disk apparatus in this embodiment is configured in the same manner as the optical disk apparatus 21 according to the first embodiment.

In this embodiment, the matrix amplifier 45 is structured such that three low-pass filters (LPFs) 49A, 49B, and 49C handling different bands are selectively provided between the subtracting circuit 37 and the amplifier circuit 40 by switching of a selecting circuit 50.

A controller 51 is a controller for controlling the operation of this optical disk apparatus, and switches contacts of the selecting circuit 50 according to the linear speed of a laser beam irradiating position, that is, according to the frequencies of a traverse component and an offset component contained in the differential signal (H−E) obtained from the subtracting circuit 37.

In this embodiment, therefore, even if the linear speed of the laser beam irradiating position varies, a phase delay is effectively avoided in the rotational frequency of the optical disk 22 to reliably extract the offset component, thereby effectively avoiding an offset in the tracking error signal TE. Furthermore, interference of the traverse component caused by a deviation of the rotational center of the optical disk 22 with respect to the transmission axis of the objective lens 24 can be reliably prevented, thereby effectively avoiding the quality degradation of the tracking error signal TE.

Therefore, the controller 51 is adapted to determine the rotational speed of a spindle motor based on an FG signal FG or the like, and to switch contacts of the selecting circuit 50. The FG signal FG is a rotational reference signal whose signal level rises in synchronization with a rotation of the spindle motor. Instead of switching low-pass filters based on the FG signal FG or the like, it is also conceivable that low-pass filters are switched in connection with the rotational speed of the optical disk according to address information obtained by processing the light detection results.

(3) Third Embodiment

Figure 8:
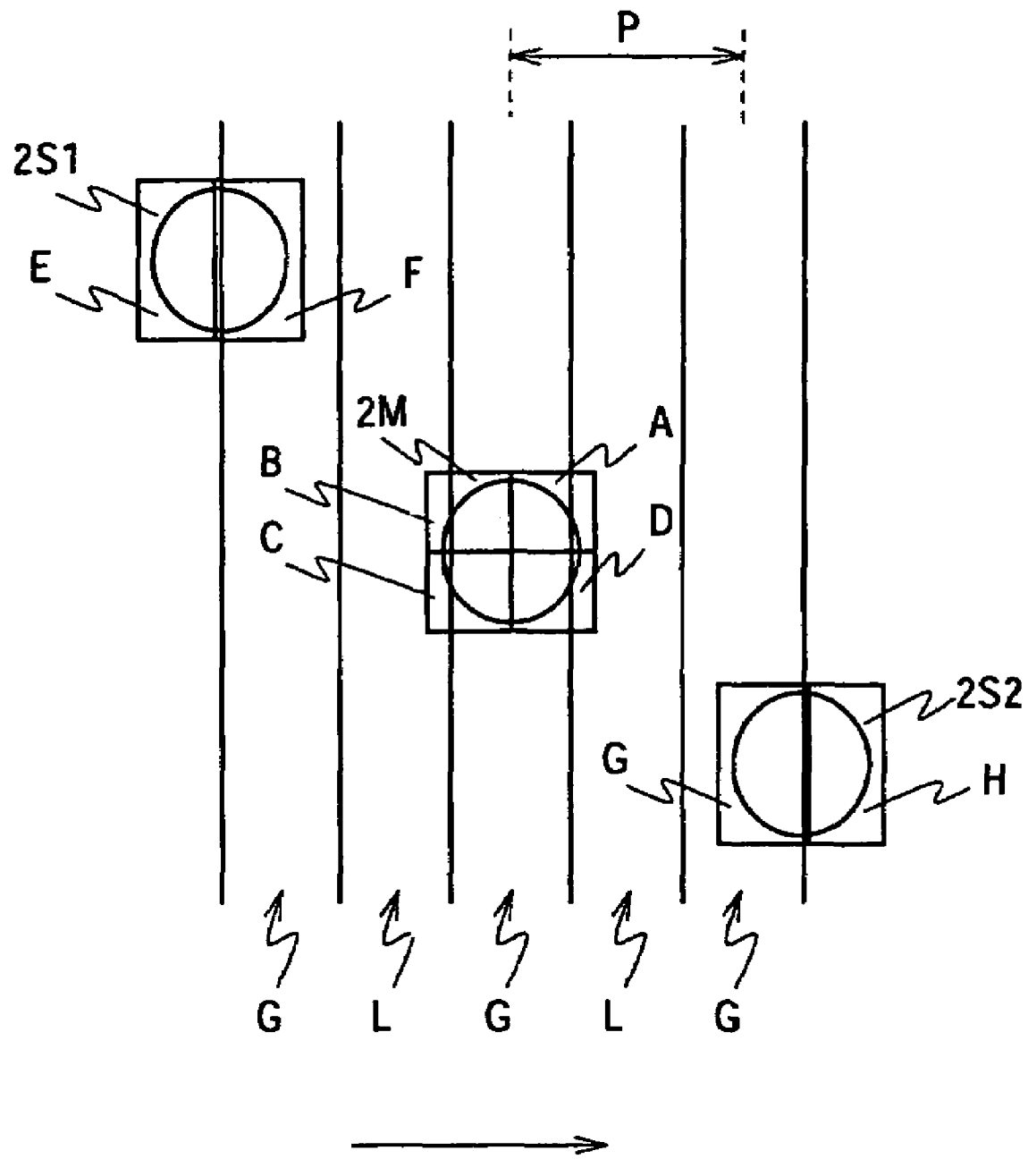
FIG. 8 is a plan view showing beam spot locations in an optical disk apparatus according to a third embodiment of the present invention.

FIG. 8 is a plan view showing beam spot locations in an optical disk apparatus according to a third embodiment of the present invention, in comparison to those shown in FIGS. 4 and 7. Except for the beam spot locations and the relevant components, the optical disk apparatus in this embodiment is configured in the same manner as the optical disk apparatus 21 according to the first or second embodiment.

In this embodiment, again, the side beams are set so as to scan in positions that are offset, on sides where the scanning of the main beam starts and ends, with respect to the main beam by approximately (¼+n)P in the inner-outer circumferential direction of the optical disk, where n denotes an integer which is set to a value of one.

In this embodiment, therefore, the side beams are not allowed to scan on a target track prior to the main beam, thereby preventing an increase of temperature at an accessed position caused by scanning of the side beams prior to the main beam. Thus, pit patterns can be formed at high precision for high-density recording.

(4) Fourth Embodiment

In this embodiment, the beam spots of the side beams are positioned with respect to the beam spot of the main beam so as to meet an expression give by (¾+n)P rather than the above-described expression given by (¼+n)P. Along with this, out of the light detection results of the light-receiving devices which receive the side beams, the light detection results obtained from regions near the light-receiving device which receives the main beam are processed to generate a tracking error signal TE. A track-cross signal TCS whose polarity reverses is generated.

Specifically, in this embodiment, using reference numerals given to the light-receiving surfaces shown in FIG. 4, a track-cross signal TCS given by TCS=(H−G)−(F−E) is generated, and a tracking error signal TE given by TE=PPm−k(G−F)flt is generated. Except for the configuration relevant to generation of the tracking error signal TE and the track-cross signal TCS, other components are structured in a similar manner to the foregoing embodiments.

The fourth embodiment, in which the side beams are positioned with respect to the main beam so as to meet an expression given by (¾+n)P, could achieve similar advantages to those of the foregoing embodiments.

(5) Other Embodiments

Although the second embodiment has been discussed in the context of switching between low-pass filters to switch the frequency for band-limiting the differential signal (H−E), the present invention is not limited to this form. The properties of a low-pass filter may be switched to switch the frequency for band-limiting the differential signal (H−E).

Although the foregoing embodiments have been discussed in the context of processing light detection results by means of a matrix amplifier to generate a tracking error signal and the like, the present invention is not limited to this form. A variety of modifications in configuration may be made, if necessary, such that a DSP has a function to process the light detection results.

Although the foregoing embodiments have been discussed in the context of making the side beams offset with respect to the main beam by approximately (¼+n)P, where n=0 or 1, the present invention is not limited to this form. The value of the integer n may be variously set as desired.

Although the foregoing embodiments have been discussed in the context of generating a tracking error signal after push-pull signals have been generated by the subtracting circuits 31 and 32, etc., the present invention is not limited to this form. The generation process which is reordered would allow equivalent signals to be generated, and a wide variety of configurations may therefore be applied to the generation processing, as required.

Although the first and second embodiments have been discussed in the context of setting the integer n to a value of zero so that the side beams is shifted with respect to the main beam by a quarter track pitch to generate a track error signal without using a differential push-pull technique, the present invention is not limited to this form. As long as the amount by which the side beams are offset with respect to the main beam is set so as to prevent the side beams from scanning a track scanned by the main beam, or the like, a differential push-pull technique may be used to generate a tracking error signal.

As described above, according to the present invention, the side beams scan in positions that are offset with respect to a main beam by approximately (¼+n)P or (¾+n)P in the radial direction of an optical disk, and a differential signal is generated from push-pull signals of the return lights of the side beams to generate a track-cross signal. Alternatively, the main beam and the side beams are set likewise, and the far-side light detection results of the return lights of the side beams are processed and subtracted from a push-pull signal of the return light of the main beam, thereby making it possible to reliably generate a track-cross signal. Furthermore, a suitable tracking error signal can be generated for an arrangement for generating the track-cross signal.

INDUSTRIAL APPLICABILITY

The present invention pertains to an optical disk apparatus and a tracking control method, which can be applied to an optical disk apparatus for, for example, DVDs.

The invention claimed is:

1. An optical disk apparatus comprising:
an objective lens configured to focus a main beam and side beams onto an optical disk, the side beams being held in a fixed relationship with respect to the main beam;
light-receiving means for receiving return lights of the main beam and the side beams; and
signal processing means for processing light detection results of the light-receiving means to generate at least a track-cross signal and a tracking error signal,
wherein the fixed relationship is such that, if the track pitch between lands, where a track is formed of a land, or the track pitch between grooves, where a track is formed of a groove, is indicated by P, the side beams scan in positions that are offset with respect to the main beam by approximately (¼+n) P in the radial direction of the optical disk,
where n denotes an integer;
the light-receiving means includes:
at least two side beam light-receiving areas for receiving the return light of the side beams, said at least two side beam light-receiving areas being divided into first and second side beam light-receiving regions by an axis corresponding to the direction in which the track extends, and
a main beam light-receiving area for receiving the return light of the main beam, said main beam light-receiving area being divided into third and fourth main beam light-receiving regions by a further axis corresponding to at least the direction in which the track extends; and
the signal processing means includes:

first subtracting means for generating a differential signal between light detection results obtained from the first and second light-receiving regions to generate the track-cross signal;
second subtracting means for generating a differential signal between light detection results obtained from the third and fourth light-receiving regions;
band-limiting means for removing a traverse component from the light detection result of a light-receiving region of the first and second side beam light-receiving regions which is a far light receiving region with respect to the third and fourth light-receiving regions;
amplifying means for amplifying an output signal of the band-limiting means with a predetermined gain; and
computing means for computing an output signal of the amplifying means with respect to an output signal of the second subtracting means so as to be added to the light detection result of the far light-receiving region out of the third and fourth light-receiving regions to generate the tracking error signal.

2. An optical disk apparatus according to claim 1, wherein the band-limiting means is configured so that the frequency bandwidth for band-limiting is switched according to the speed at which the main beam scans on the optical disk.

3. An optical disk apparatus according to claim 1, wherein the side beams are a set of optical beams between with which the main beam is interposed.

4. An optical disk apparatus according to claim 1, wherein n is a value of one or a value or two.

5. A tracking control method comprising:
focusing a main beam and a side beam onto an optical disk, the side beam being held in a fixed relationship with respect to the main beam;
receiving return lights of the main beam and the side beam;
processing light detection results of the return lights to generate at least a track-cross signal and a tracking error signal; and
controlling operation of an optical pickup according to the track-cross signal and the tracking error signals,
wherein the fixed relationship is such that, if the track pitch between lands, where a track is formed of a land, or the track pitch between grooves, where a track is formed of a groove, is indicated by P the side beam scans in a position that is offset with respect to the main beam by approximately (¼+n) P in the radial direction of the optical disk;
the return light of the side beam is received at a light-receiving surface which is divided into first and second light-receiving regions by a dividing line corresponding to the direction in which the track extends;
the return light of the main beam is received at a light-receiving surface which is divided into third and fourth light-receiving regions by a dividing line corresponding to at least the direction in which the track extends;
a differential signal between light detection results obtained from the first and second light-receiving regions is generated to generate the track-cross signal;
a differential signal between light detection results obtained from the third and fourth light-receiving regions is generated;
a traverse component is removed from the light detection result of a light-receiving region of the first and second light-receiving regions which is a far light receiving region with respect to the third and fourth light-receiving regions, and the result is amplified with a predetermined gain; and the result is computed with respect to the differential signal between the light detection results obtained from the third and fourth light-receiving regions so as to be added to the light detection result of the far light-receiving region out of the third and fourth light-receiving regions to generate the tracking error signal.

6. An optical disk apparatus comprising:
an objective lens configured to focus a main beam and a side beam onto an optical disk, the side beam being held in a fixed relationship with respect to the main beam;
light-receiving means for receiving return lights of the main beam and the side beam; and
signal processing means for processing light detection results of the light-receiving means to generate at least a track-cross signal and a tracking error signal,
wherein the fixed relationship is such that, if the track pitch between lands, where a track is formed of a land, or the track pitch between grooves, where a track is formed of a groove, is indicated by P, the side beam scans in a position that is offset with respect to the main beam by approximately (¾+n) P in the radial direction of the optical disk,
where n denotes an integer;
the light-receiving means includes:
a side beam light-receiving surface for receiving the return light of the side beam, said side beam light-receiving surface being divided into first and second light-receiving regions by a dividing line corresponding to the direction in which the track extends, and
a main beam light-receiving surface for receiving the return light of the main beam, said main beam light-receiving surface being divided into third and fourth light-receiving regions by a dividing line corresponding to at least the direction in which the track extends; and
the signal processing means includes:
first subtracting means for generating a differential signal between light detection results obtained from the first and second light-receiving regions to generate the track-cross signal;
second subtracting means for generating a differential signal between light detection results obtained from the third and fourth light-receiving regions;
band-limiting means for removing a traverse component from the light detection result of a light-receiving region of the first and second light-receiving regions which is a near light receiving region with respect to the third and fourth light-receiving regions;
amplifying means for amplifying an output signal of the band-limiting means with a predetermined gain; and
computing means for computing an output signal of the amplifying means with respect to an output signal of the second subtracting means so as to be added to the light detection result of the far light-receiving region out of the third and fourth light-receiving regions to generate the tracking error signal.

7. A tracking control method comprising:
focusing a main beam and a side beam onto an optical disk, the side beam being held in a fixed relationship with respect to the main beam;
receiving return lights of the main beam and the side beam;

processing light detection results of the return lights to generate at least a track-cross signal and a tracking error signal; and controlling operation of an optical pickup according to the track-cross signal and the tracking error signals, wherein the fixed relationship is such that, if the track pitch between lands, where a track is formed of a land, or the track pitch between grooves, where a track is formed of a groove, is indicated by P, the side beam scans in a position that is offset with respect to the main beam by approximately (¾+n) P in the radial direction of the optical disk;

receiving the return light of the side beam at a light-receiving surface which is divided into first and second light-receiving regions by a dividing line corresponding to the direction in which the track extends;

receiving the return light of the main beam at a light-receiving surface which is divided into third and fourth light-receiving regions by a dividing line corresponding to at least the direction in which the track extends;

generating a differential signal between light detection results obtained from the first and second light-receiving regions to produce the track-cross signal;

generating a differential signal between light detection results obtained from the third and fourth light-receiving regions;

removing a traverse component from the light detection result of a light-receiving region of the first and second light-receiving regions which is a near light receiving region with respect to the third and fourth light-receiving regions, and the result is amplified with a predetermined gain; and computing the result with respect to the differential signal between the light detection results obtained from the third and fourth light-receiving regions so as to be added to the light detection result of the far light-receiving region out of the third and fourth light-receiving regions to generate the tracking error signal.

* * * * *